(12) United States Patent
Lu (10) Patent No.: US 9,960,689 B1
(45) Date of Patent: May 1, 2018

(54) RESONANT CONTROL DEVICE AND RESONANT CONTROL METHOD THEREOF

(71) Applicant: MEAN WELL (GuangZhou) Electronics Co., Ltd., Guangzhou (CN)

(72) Inventor: Shao-Jie Lu, Guangzhou (CN)

(73) Assignee: MEAN WELL (GUANGZHOU) ELECTRONICS CO., LTD., Guangzhou (CN)

( * ) Notice: Subject to any disclaimer, the term of this patent is extended or adjusted under 35 U.S.C. 154(b) by 0 days. days.

(21) Appl. No.: 15/386,489

(22) Filed: Dec. 21, 2016

(51) Int. Cl.
*H02M 3/335* (2006.01)
*H02M 3/337* (2006.01)
*H02M 1/00* (2006.01)
*H02M 1/36* (2007.01)

(52) U.S. Cl.
CPC ....... *H02M 3/33507* (2013.01); *H02M 3/335* (2013.01); *H02M 3/3376* (2013.01); *H02M 1/36* (2013.01); *H02M 3/337* (2013.01); *H02M 3/33546* (2013.01); *H02M 2001/0058* (2013.01)

(58) Field of Classification Search
CPC ........... H02M 1/36; H02M 2001/0058; H02M 3/335; H02M 3/33546; H02M 3/337; H02M 3/3376
See application file for complete search history.

(56) References Cited

U.S. PATENT DOCUMENTS

| 6,049,471 A * | 4/2000 | Korcharz | H02M 3/33515 363/20 |
| 2008/0316776 A1* | 12/2008 | Nakanishi | H02M 3/3353 363/21.02 |
| 2009/0218994 A1* | 9/2009 | Liu | H02M 3/337 323/234 |
| 2009/0251055 A1* | 10/2009 | Kimura | H02M 3/3378 315/119 |
| 2011/0085354 A1* | 4/2011 | Wang | H02M 1/4225 363/21.02 |
| 2014/0376270 A1* | 12/2014 | Kern | H02M 3/33507 363/17 |
| 2016/0172988 A1* | 6/2016 | Chen | H02M 3/33546 363/17 |

* cited by examiner

*Primary Examiner* — Fred E Finch, III
*Assistant Examiner* — Rafael O De Leon Domenech
(74) *Attorney, Agent, or Firm* — Muncy, Geissler, Olds & Lowe, P.C.

(57) ABSTRACT

A resonant control device and a resonant control method thereof controls a resonant converter connected with a load. An output voltage is applied across the load. Firstly, a setting voltage is used to perform voltage compensation on the output voltage to generate a control value. Then, pulse modulation signals are generated according to the control value and a switch value, so as to drive the resonant converter to regulate the output voltage. Each pulse modulation signal has the maximum frequency and the minimum frequency. The switch value is equal to the minimum frequency divided by the maximum frequency and less than 0.5. Finally, the process determines whether the control value is less than the switch value. If the answer is yes, PWM signals as the pulse modulation signals are generated, and their frequency is less than the maximum frequency to increase a lower-limit range of the output voltage.

15 Claims, 5 Drawing Sheets

RESONANT CONTROL DEVICE AND RESONANT CONTROL METHOD THEREOF

BACKGROUND OF THE INVENTION

Field of the Invention

The present invention relates to a resonant control technology applied to a power supply, particularly to a resonant control device and a resonant control method thereof.

Description of the Related Art

In recent years, various electronic products develop toward preciseness and minimization. Presently, a conventional power converter cannot satisfy requirement for volume and efficiency. The power converter is asked to improve its power density. When the power semiconductor technology matured in 1970, a switching power supply was widely applied. Thus, nowadays, a switch mode power supply (SMPS) with high efficiency is important in power industry.

Figure 1:
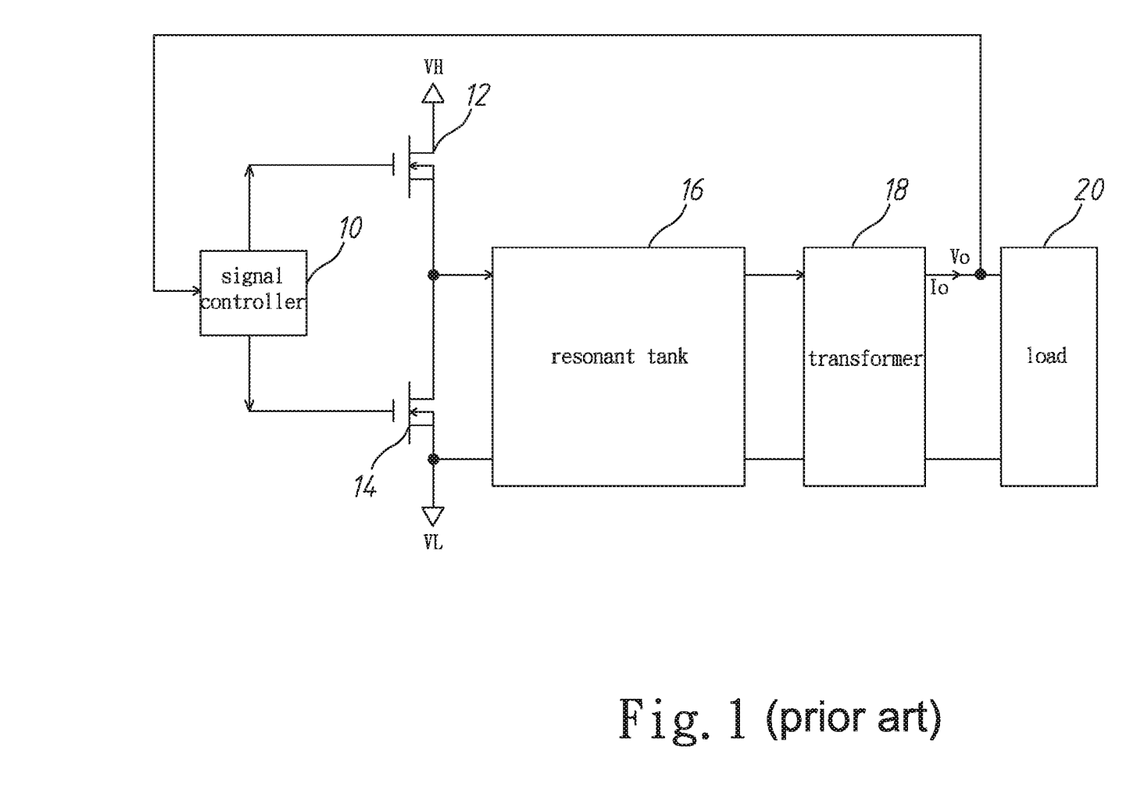
FIG. 1 is a diagram schematically showing a resonant converter in a conventional technology.
Figure 2:
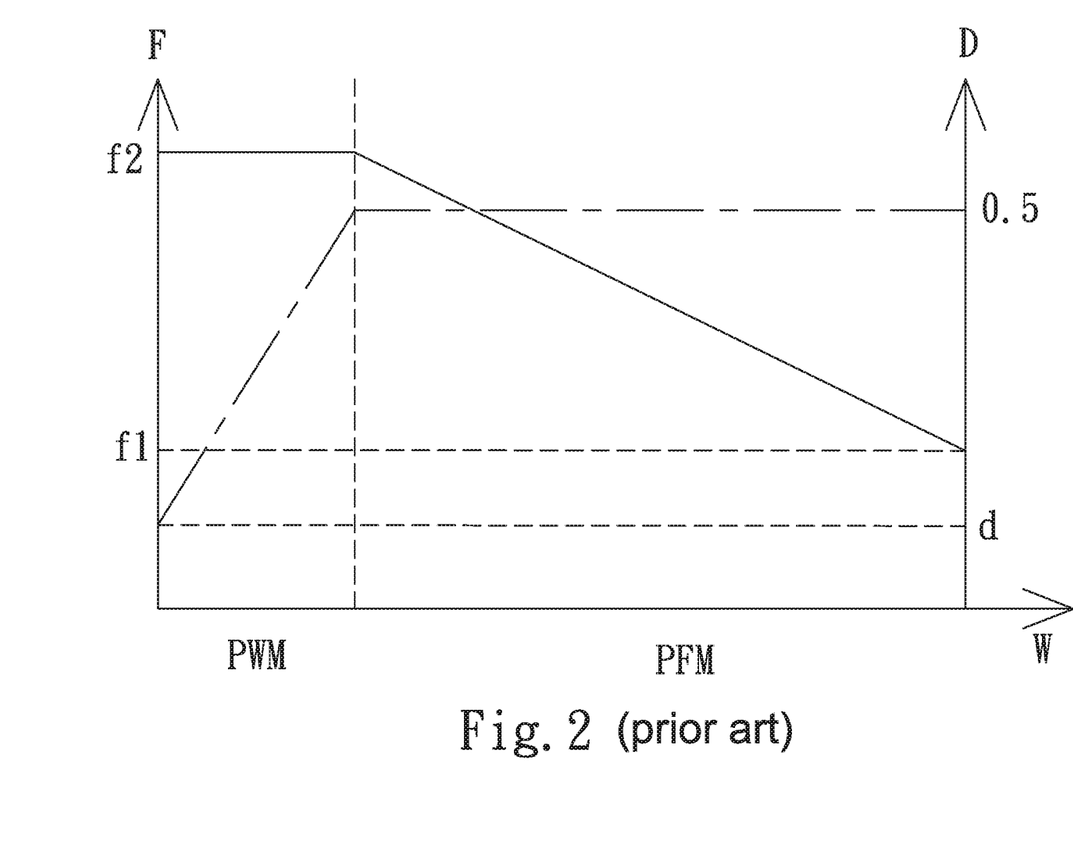
FIG. 2 is diagram showing curves of a duty cycle and a frequency of a pulse modulation signal with respect to an output power in a conventional technology.

The switching power supply uses a half-bridge resonant converter or a full-bridge resonant converter with high efficiency. Take a half-bridge resonant converter for example, as shown in FIG. 1. The half-bridge resonant converter includes a signal controller 10, a first electrical switch 12, a second electrical switch 14, a resonant tank 16 and a transformer 18, wherein the first electrical switch 12 and the second electrical switch 14 are realized with NMOS-FETs. Theoretically, the signal controller 10 generates two pulse modulation signals to alternately switch the first electrical switch 12 and the second electrical switch 14. When the first electrical switch 12 is turned on, the second electrical switch 14 is turned off whereby energy flows from a high voltage terminal VH to the resonant tank 16 and energy is transmitted to a load. When the first electrical switch 12 is turned off, the second electrical switch 14 is turned on whereby the energy is discharged from the resonant tank 16 to a low voltage terminal VL. The transformer 18 receives the energy of the resonant tank 16 to convert it into an output voltage Vo. The output voltage Vo is applied to the load 20 to generate an output current Io. The output voltage Vo and the output current Io form an output power W. The resonant converter operates in PWM mode or PFM mode. Refer to FIG. 2. In PWM mode, the pulse modulation signals are PWM signals. The duty cycle D of the PWM signal increases from a threshold d until the duty cycle D equals 0.5. In PFM mode, the duty cycle D is a fixed value, and the pulse modulation signals are PFM signals. In PFM mode, the frequency F of the PFM signal increases when the output power W decreases. The frequency F of the PFM signal increases from the minimum frequency f1 until the frequency F equals the maximum frequency f2. In PWM mode, the frequency F of the PWM signal equals the maximum frequency f2. If the half-bridge resonant converter operates in a lower-limit range, the frequency F of the PWM signal has to increase to maintain the output voltage Vo. However, owning to hardware limitation, the frequency F of the PWM signal cannot endlessly increase whereby the half-bridge resonant converter cannot operate in a wide range. Besides, in PWM mode, the high-frequency state has more switching loss and higher noise. For digital control, since a PWM module of the signal controller 10 has insufficient resolution, the output voltage Vo is easily unstable.

To overcome the abovementioned problems, the present invention provides a resonant control device and a resonant control method thereof.

SUMMARY OF THE INVENTION

A primary objective of the present invention is to provide a resonant control device and a resonant control method thereof, which sets a switch value without adding a hardware cost, wherein the switch value is generally less than 0.5 and corresponds to the minimum frequency and the maximum frequency of a PWM signal. The resonant control device and the method thereof performs PWM mode or PFM mode according to the switch value, and generates the PWM signals whose frequency is less than the maximum frequency, thereby improving the light-load efficiency of a resonant converter, decreasing the start-up resonant current, switching loss and noise, and increasing a lower-limit range of an output voltage of the resonant converter and an operation range of the output voltage.

To achieve the abovementioned objectives, the present invention provides a resonant control device, which comprises a feedback controller and a processor. The feedback controller is connected with an output terminal of a resonant converter, such as a LLC full-bridge resonate converter or a LLC half-bridge resonate converter. The output terminal is connected with a load, and an output voltage is applied across the load. The output voltage is applied to the load to generate an output current, and the output voltage and the output current form an output power. The feedback controller receives a setting voltage and the output voltage and uses the setting voltage to perform voltage compensation on the output voltage to generate a control value. The processor is connected with the feedback controller and the resonant converter, presets a switch value, receives the control value, generates pulse modulation signals according to the control value and the switch value, and uses the pulse modulation signals to drive the resonant converter to regulate the output voltage. Each pulse modulation signal has a maximum frequency and a minimum frequency, and the switch value equals the minimum frequency divided by the maximum frequency and is less than 0.5. The maximum frequency is determined by hardware properties of a circuit of the resonant converter, like electrical switches. The minimum frequency is determined by a resonant tank of the resonant converter. The resonant tank is formed by a resonating inductor $L_R$, a magnetizing inductor $L_M$, and a resonating capacitor $C_R$ connected in series, and the minimum frequency is between $$\frac{1}{2\pi\sqrt{(L_R+L_M)C_R}} \text{ and } \frac{1}{2\pi\sqrt{L_R \cdot C_R}}.$$

When the control value is larger than or equal to the switch value, the pulse modulation signals are pulse frequency modulation signals. When the control value is less than the switch value, the pulse modulation signals are pulse width modulation signals whose frequency is a first fixed value less than the maximum frequency, and the first fixed value is larger than or equal to the minimum frequency. A duty cycle of the pulse frequency modulation signal is a second fixed value less than or equal to 0.5, and the second fixed value is larger than a preset limitation value. The preset limitation value is larger than 0. A duty cycle of the pulse width modulation signal is directly linearly proportional to the output power. For example, the minimum value and the maximum value of the duty cycle of the pulse width modulation signal are respectively equal to the preset limitation value and the switch value. A frequency of the pulse frequency modulation signal is linearly inversely proportional to the output power. For example, the maximum value and the minimum value of the frequency of the pulse frequency modulation signal are respectively equal to the maximum frequency and the minimum frequency.

The feedback controller further comprises a subtractor and a voltage compensator. The subtractor is connected with the output terminal, receives the setting voltage and the output voltage, and subtracts the output voltage from the setting voltage to obtain a difference voltage. The voltage compensator is connected with the subtractor and the processor, receives the difference voltage, and performs voltage compensation on the difference voltage to generate the control value.

The present invention also provides a resonant control method, which controls a resonant converter connected with a load, and an output voltage is applied across the load, and the output voltage is applied to the load to generate an output current, and the output voltage and the output current form an output power. Firstly, a setting voltage and the output voltage are received and the setting voltage is used to perform voltage compensation on the output voltage to generate a control value. Then, the control value is received, and pulse modulation signals are generated according to the control value and a switch value, and the pulse modulation signals are used to drive the resonant converter to regulate the output voltage. Each pulse modulation signal has a maximum frequency and a minimum frequency, and the switch value equals the minimum frequency divided by the maximum frequency. In general, the switch value is less than 0.5.

Finally, the process determines whether the control value is less than the switch value. If the answer is no, pulse frequency modulation signals used as the pulse modulation signals are generated. If the answer is yes, pulse width modulation signals used as the pulse modulation signals are generated. A frequency of the pulse width modulation signal is a first fixed value less than the maximum frequency, and the first fixed value is larger than or equal to the minimum frequency. A duty cycle of the pulse frequency modulation signal is a second fixed value less than or equal to 0.5, and the second fixed value is larger than a preset limitation value. The preset limitation value is larger than 0. A duty cycle of the pulse width modulation signal is directly linearly proportional to the output power. For example, the minimum value and the maximum value of the duty cycle of the pulse width modulation signal are respectively equal to the preset limitation value and the switch value. A frequency of the pulse frequency modulation signal is linearly inversely proportional to the output power. For example, the maximum value and the minimum value of the frequency of the pulse frequency modulation signal are respectively equal to the maximum frequency and the minimum frequency.

In the step of receiving the setting voltage and the output voltage and using the setting voltage to perform voltage compensation on the output voltage to generate the control value, the setting voltage and the output voltage are received, and the output voltage is subtracted from the setting voltage to obtain a difference voltage, and then the difference voltage is received and voltage compensation is performed on the difference voltage to generate the control value.

Below, the embodiments are described in detail in cooperation with the drawings to make easily understood the technical contents, characteristics and accomplishments of the present invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Figure 3:
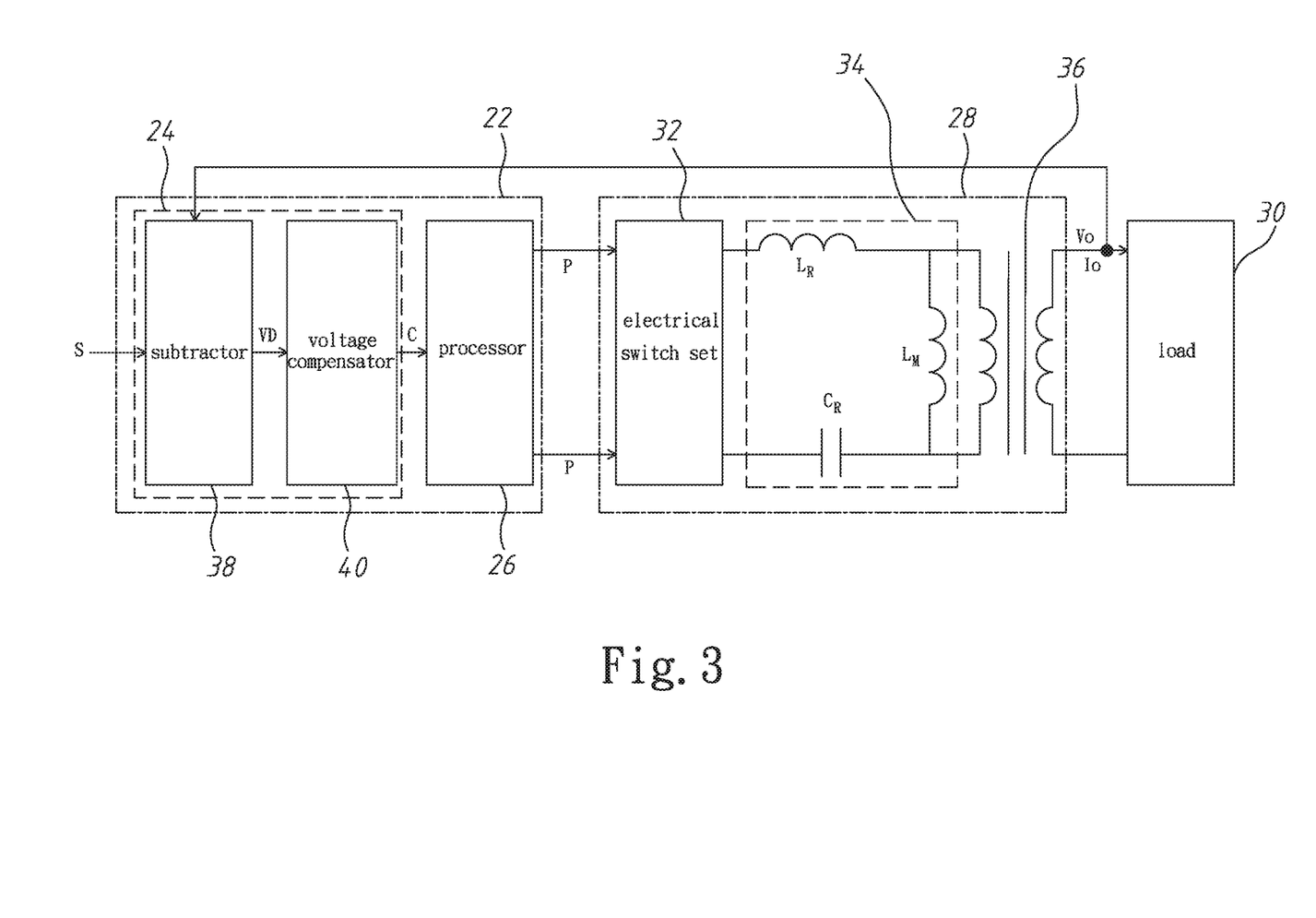
FIG. 3 is a diagram schematically showing a resonant control device and a resonant converter according to an embodiment of the present invention.
Figure 4:
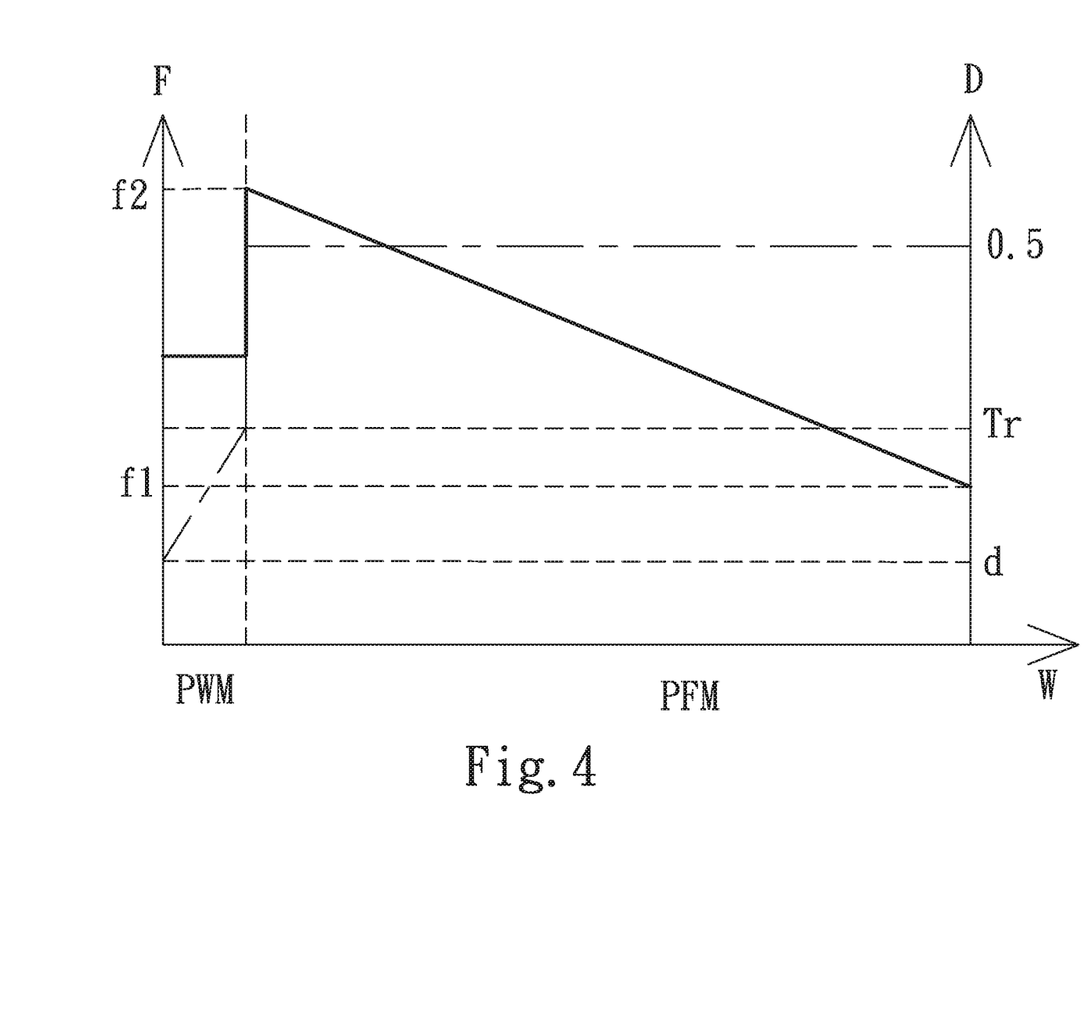
FIG. 4 is diagram showing curves of a duty cycle and a frequency of a pulse modulation signal with respect to an output power according to an embodiment of the present invention.

Refer to FIG. 3 and FIG. 4. The resonant control device 22 of the present invention is introduced as below. The resonant control device 22 comprises a feedback controller 24 and a processor 26. The feedback controller 24 is connected with an output terminal of a resonant converter 28, wherein the output terminal is connected with a load 30. An output voltage Vo is applied across the load 30. The output voltage Vo is applied to the load 30 to generate an output current Io. The output current Io and the output voltage Vo form an output power W. For example, the resonant converter 28 is a LLC full-bridge resonate converter or a LLC half-bridge resonate converter. The resonant converter 28 comprises an electrical switch set 32, a resonant tank 34 and a transformer 36. The electrical switch set 32 is sequentially connected with the resonant tank 34, the transformer 36 and the load 36. The resonant tank 34 is formed by a resonating inductor $L_R$, a magnetizing inductor $L_M$, and a resonating capacitor $C_R$ connected in series. The magnetizing inductor $L_M$ is connected with a primary winding of the transformer 34 in parallel. An end of the magnetizing inductor $L_M$ is connected with the electrical switch set 32 through the resonating inductor $L_R$, and the other end of magnetizing inductor $L_M$ is connected with the electrical switch set 32 through the resonating capacitor $C_R$.

The feedback controller 24 receives a setting voltage S and the output voltage Vo and uses the setting voltage S to perform voltage compensation on the output voltage Vo to generate a control value C. The processor 26 is connected with the feedback controller 24 and the electrical switch set 32 of the resonant converter 28, and presets a switch value Tr without adding a hardware cost. The processor 26 receives the control value C, generates two pulse modulation signals P according to the control value C and the switch value Tr, and uses the pulse modulation signals P to drive the resonant converter 28 to regulate the output voltage Vo. The resonant control device 22 sets a minimum frequency f1 and a maximum frequency f2. The switch value Tr is equal to the minimum frequency f1 divided by the maximum frequency f2. In general, the switch value Tr is less than 0.5. The maximum frequency f2 is determined by hardware properties of a circuit of the resonant converter 28, like electrical switches. The minimum frequency f1 is determined by the resonant tank 34 of the resonant converter 28. The minimum frequency f1 is $$\frac{1}{2\pi\sqrt{(L_R+L_M)C_R}} \text{ or } \frac{1}{2\pi\sqrt{L_R \cdot C_R}}.$$

Alternatively, the minimum frequency f1 ranges between $$\frac{1}{2\pi\sqrt{(L_R+L_M)C_R}} \text{ and } \frac{1}{2\pi\sqrt{L_R \cdot C_R}}.$$

When the control value C is larger than or equal to the switch value Tr, the pulse modulation signals P are pulse frequency modulation signals. When the control value C is less than the switch value Tr, the pulse modulation signals P are pulse width modulation signals whose frequency F is a first fixed value less than the maximum frequency f2. The first fixed value is larger than is larger than or equal to the minimum frequency f2. A duty cycle D of the pulse frequency modulation signal is a second fixed value less than or equal to 0.5, and the second fixed value is larger than a preset limitation value d. The preset limitation value d is larger than 0. In the embodiment, the second fixed value is 0.5. A duty cycle D of the pulse width modulation signal is directly linearly proportional to the output power W. For example, the minimum value and the maximum value of the duty cycle D of the pulse width modulation signal are respectively equal to the preset limitation value d and the switch value Tr, whereby the duty cycle D of the pulse width modulation signal ranges between the preset limitation value d and the switch value Tr. A frequency F of the pulse frequency modulation signal is linearly inversely proportional to the output power W. For example, the maximum value and the minimum value of the frequency F of the pulse frequency modulation signal are respectively equal to the maximum frequency f2 and the minimum frequency f1, whereby the frequency F of the pulse frequency modulation signal ranges between the maximum frequency f2 and the minimum frequency f1. Since the present invention sets the switch value Tr to less than 0.5, the pulse width modulation signal becomes the pulse frequency modulation signal before the duty cycle D of the pulse width modulation signal increases to 0.5 with the output power W increased. That is to say, the processor 26 uses the switch value Tr as a standard to switch PWM mode and PFM mode. Compared with a conventional technology, the frequency F of the pulse width modulation signal of the present invention is lower and the maximum value of the duty cycle D of the pulse width modulation signal of the present invention is lower. Thus, the present invention still has the longer turn-on time to increase a lower-limit range of the output voltage Vo and an operation range of the output voltage Vo, thereby improving the light-load efficiency of the resonant converter 28, and decreasing the start-up current, switching loss and noise. Since the duty cycle D of the pulse width modulation signal becomes low, the switch value Tr affects the frequency F of the pulse width modulation signal. A user can set the switch value Tr and the frequency F of the pulse width modulation signal according to requirement for efficiency.

The feedback controller 24 further comprises a subtractor 38 and a voltage compensator 40. For example, the voltage compensator 40 is a proportional-integral-derivative controller (PID controller) or a proportional-integral controller (PI controller). The subtractor 38 is connected with the output terminal of the resonant converter 28, receives the setting voltage S and the output voltage Vo, and subtracts the output voltage Vo from the setting voltage S to obtain a difference voltage VD. The voltage compensator 40 is connected with the subtractor 38 and the processor 26, receives the difference voltage VD, and performs voltage compensation on the difference voltage VD to generate the control value C. The PID controller is realized with a programmable logic controller (PLC) or a digital controller having a panel.

Figure 5:
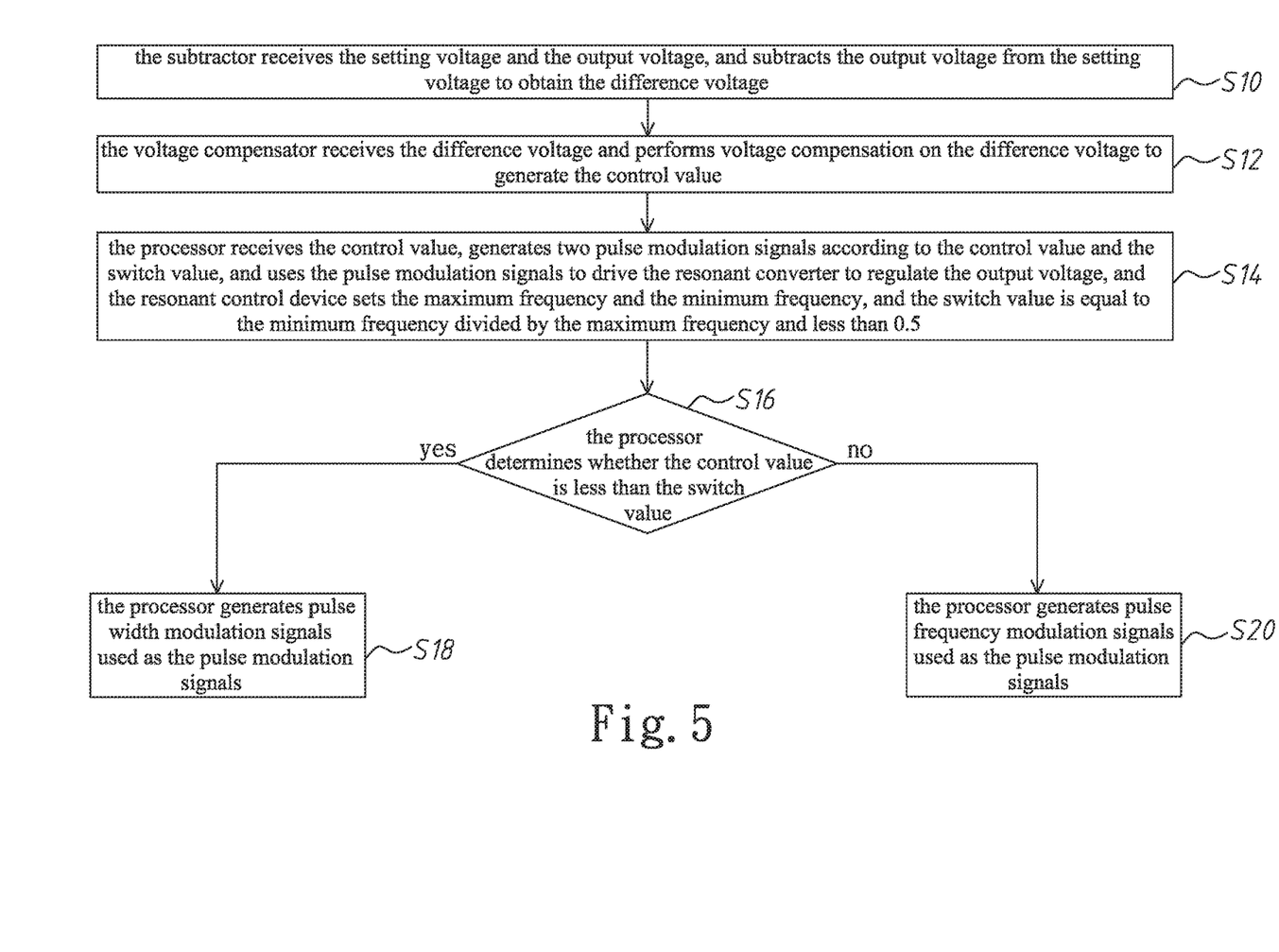
FIG. 5 is a flowchart of a resonant control method according to an embodiment of the present invention.

The resonant control method of the resonant control device of the present invention is introduced as below. Refer to FIG. 3, FIG. 4 and FIG. 5. Firstly, in Step S10, the subtractor 38 receives the setting voltage S and the output voltage Vo, and subtracts the output voltage Vo from the setting voltage S to obtain the difference voltage VD. Then, in Step S12, the voltage compensator 40 receives the difference voltage VD and performs voltage compensation on the difference voltage VD to generate the control value C. Then, in Step S14, the processor 26 receives the control value C, generates two pulse modulation signals P according to the control value C and the switch value Tr, and uses the pulse modulation signals P to drive the resonant converter 28 to regulate the output voltage Vo. The resonant control device 22 sets the maximum frequency f2 and the minimum frequency f1, and the switch value Tr is equal to the minimum frequency f1 divided by the maximum frequency f2 and less than 0.5. Finally, in Step S16, the processor 26 determines whether the control value C is less than the switch value Tr. If the answer is yes, the process proceeds to Step S18. In Step S18, the processor 26 generates pulse width modulation signals used as the pulse modulation signals P. If the answer is no, the process proceeds to Step S20. In Step S20, the processor 26 generates pulse frequency modulation signals used as the pulse modulation signals P.

For example, the minimum frequency f1 is 60 kHz, and the maximum frequency f2 is 300 kHz, and the switch value Tr is 0.2, and the preset limitation value d is 0.1. The frequency F of the pulse width modulation signal used as the pulse modulation signal P is set to 100 kHz, and the duty cycle D of the pulse frequency modulation signal used as the pulse modulation signal P is set to 0.5. When the load 30 becomes light, the control value C becomes low. When the control value C is less than 0.2, the processor 26 generates the pulse width modulation signals used as the pulse modulation signals P whose duty cycle D depends on the output power W. When the load 30 becomes heavy, the control value C becomes high. When the control value C is larger than or equal to 0.2, the processor 26 generates the pulse frequency modulation signals used as the pulse modulation signals P whose frequency F depends on the output power W. Alternatively, the setting voltage S is varied to generate the pulse width modulation signals or the pulse frequency modulation signals. When the setting voltage S becomes low and the output voltage Vo is invariable, the control value C becomes low. When the control value C is less than 0.2, the processor 26 generates the pulse width modulation signals used as the pulse modulation signals P whose duty cycle D depends on the output power W. When the setting voltage S becomes high and the output voltage Vo is invariable, the control value C becomes high. When the control value C is larger than or equal to 0.2, the processor 26 generates the pulse frequency modulation signals used as the pulse modulation signals P whose frequency F depends on the output power W.

Step S10 and Step S12 are replaced with a step of using the feedback controller 24 to receive the setting voltage S and the output voltage Vo and using the setting voltage S to perform voltage compensation on the output voltage Vo to generate the control value C. Then, Step S14 and steps thereafter are sequentially performed to improve the light-load efficiency of the resonant converter, decrease the start-up resonant current, switching loss and noise, and increase the lower-limit range of the output voltage Vo of the resonant converter and the operation range of the output voltage Vo.

In conclusion, the present invention sets the switch value to lower the frequency of the pulse width modulation signal and increase the lower-limit range of the output voltage of the resonant converter.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A resonant control device comprising:
   a feedback controller connected with an output terminal of a resonant converter, and said output terminal is connected with a load, and an output voltage is applied across said load, and said feedback controller receives a setting voltage and said output voltage and uses said setting voltage to perform voltage compensation on said output voltage to generate a control value; and
   a processor connected with said feedback controller and said resonant converter, presetting a switch value, receiving said control value, generating pulse modulation signals according to said control value and said switch value, and using said pulse modulation signals to drive said resonant converter to regulate said output voltage, and said resonant converter determines a maximum frequency and a minimum frequency, and said switch value equals said minimum frequency divided by said maximum frequency, and when said control value is larger than or equal to said switch value, said pulse modulation signals are pulse frequency modulation signals, and when said control value is less than said switch value, said pulse modulation signals are pulse width modulation signals whose frequency is a first fixed value less than said maximum frequency, and said first fixed value is larger than or equal to said minimum frequency.

2. The resonant control device according to claim 1, wherein a duty cycle of said pulse width modulation signal ranges between said switch value and a preset limitation value.

3. The resonant control device according to claim 1, wherein a duty cycle of said pulse frequency modulation signal is a second fixed value less than or equal to 0.5, and said second fixed value is larger than a preset limitation value, and a frequency of said pulse frequency modulation signal ranges between said maximum frequency and said minimum frequency.

4. The resonant control device according to claim 3, wherein said output voltage is applied to said load to generate an output current, and said output voltage and said output current form an output power, and a duty cycle of said pulse width modulation signal is directly linearly proportional to said output power, and a frequency of said pulse frequency modulation signal is linearly inversely proportional to said output power.

5. The resonant control device according to claim 1, wherein said feedback controller further comprises:
   a subtractor connected with said output terminal, receiving said setting voltage and said output voltage, and subtracting said output voltage from said setting voltage to obtain a difference voltage; and
   a voltage compensator connected with said subtractor and said processor, receiving said difference voltage, and performing voltage compensation on said difference voltage to generate said control value.

6. The resonant control device according to claim 5, wherein said voltage compensator is a proportional-integral-derivative controller (PID controller) or a proportional-integral controller (PI controller).

7. The resonant control device according to claim 1, wherein said resonant converter is a LLC resonant converter.

8. The resonant control device according to claim 1, wherein said maximum frequency is determined by a circuit of said resonant converter, and said minimum frequency is determined by a resonant tank of said resonant converter, said resonant tank selectively comprises a resonating inductor $L_R$, a magnetizing inductor $L_M$, and a resonating capacitor $C_R$ connected in series, and said minimum frequency ranges between $$\frac{1}{2\pi\sqrt{(L_R+L_M)C_R}} \text{ and } \frac{1}{2\pi\sqrt{L_R \cdot C_R}}.$$

9. A resonant control method, which controls a resonant converter connected with a load, and an output voltage is applied across said load, and said resonant converter determines a maximum frequency and minimum frequency, said resonant control method comprising:
   receiving a setting voltage and said output voltage, then using said setting voltage to perform voltage compensation on said output voltage to generate a control value;
   receiving said control value, generating pulse modulation signals according to said control value and a switch value, and using said pulse modulation signals to drive said resonant converter to regulate said output voltage, and said switch value equals said minimum frequency divided by said maximum frequency; and
   determining whether said control value is less than said switch value:
      if yes, generating pulse width modulation signals used as said pulse modulation signals, and a frequency of said pulse width modulation signal is a first fixed value less than said maximum frequency, and said first fixed value is larger than or equal to said minimum frequency; and
      if no, generating pulse frequency modulation signals used as said pulse modulation signals.

10. The resonant control method according to claim 9, wherein a duty cycle of said pulse width modulation signal ranges between said switch value and a preset limitation value.

11. The resonant control method according to claim 9, wherein a duty cycle of said pulse frequency modulation signal is a second fixed value less than or equal to 0.5, and said second fixed value is larger than a preset limitation value, and a frequency of said pulse frequency modulation signal ranges between said maximum frequency and said minimum frequency.

12. The resonant control method according to claim 11, wherein said output voltage is applied to said load to generate an output current, and said output voltage and said output current form an output power, and a duty cycle of said pulse width modulation signal is directly linearly proportional to said output power, and a frequency of said pulse frequency modulation signal is linearly inversely proportional to said output power.

13. The resonant control method according to claim 9, wherein said step of receiving said setting voltage and said output voltage and using said setting voltage to perform voltage compensation on said output voltage to generate said control value further comprises:

receiving said setting voltage and said output voltage, and subtracting said output voltage from said setting voltage to obtain a difference voltage; and receiving said difference voltage and performing voltage compensation on said difference voltage to generate said control value.

14. The resonant control method according to claim 9, wherein said resonant converter is a LLC resonant converter.

15. The resonant control method according to claim 9, wherein said maximum frequency is determined by a circuit of said resonant converter, and said minimum frequency is determined by a resonant tank of said resonant converter, said resonant tank selectively comprises a resonating inductor $L_R$, a magnetizing inductor $L_M$, and a resonating capacitor $C_R$ connected in series, and said minimum frequency ranges between $$\frac{1}{2\pi\sqrt{(L_R+L_M)C_R}} \text{ and } \frac{1}{2\pi\sqrt{L_R \cdot C_R}}.$$

* * * * *